(12) United States Patent
Kallakmaa et al.

(10) Patent No.: US 12,491,219 B2
(45) Date of Patent: Dec. 9, 2025

(54) **MICROORGANISM STRAIN *PEDIOCOCCUS ACIDILACTICI* TAK 589 COCCOBEST AS AN ANTIMICROBIAL AND ANTIOXIDANT PROBIOTIC**

(71) Applicant: BIOCC OÜ, Tartu (EE)

(72) Inventors: Pille Kallakmaa, Järva-Jaani (EE); Tanel Kaart, Tartu (EE); Kristiina Märs, Törvandi (EE); Meelis Ots, Tartu (EE); Eve Rihma, Tartu (EE); Jaan Vihalemm, Tartu (EE); Epp Songisepp, Tartu (EE); Liina Kuus, Kambja vald (EE); Heili Sadam, Tartu vald (EE)

(73) Assignee: BIOCC OÜ, Tartu (EE)

( * ) Notice: Subject to any disclaimer, the term of this patent is extended or adjusted under 35 U.S.C. 154(b) by 293 days.

(21) Appl. No.: 18/026,904

(22) PCT Filed: Sep. 17, 2021

(86) PCT No.: PCT/IB2021/000739
§ 371 (c)(1),
(2) Date: Mar. 17, 2023

(87) PCT Pub. No.: WO2022/058798
PCT Pub. Date: Mar. 24, 2022

(65) Prior Publication Data
US 2023/0330161 A1 Oct. 19, 2023

(30) Foreign Application Priority Data
Sep. 18, 2020 (EE) .................. P202000014

(51) Int. Cl.
*A61K 39/02* (2006.01)
*A23K 10/18* (2016.01)
*A23K 50/10* (2016.01)
*A23K 50/60* (2016.01)
*A23L 29/00* (2016.01)
*A61K 9/19* (2006.01)
*A61K 35/744* (2015.01)
*A61K 35/747* (2015.01)
*A61P 1/12* (2006.01)
*A61P 31/04* (2006.01)

(52) U.S. Cl.
CPC ............ *A61K 35/744* (2013.01); *A23K 10/18* (2016.05); *A23K 50/10* (2016.05); *A23K 50/60* (2016.05); *A23L 29/065* (2016.08); *A61K 9/19* (2013.01); *A61P 1/12* (2018.01); *A61P 31/04* (2018.01)

(58) Field of Classification Search
None
See application file for complete search history.

(56) References Cited

PUBLICATIONS

Alireza et al (J. Biosci. And Bioengineering. Aug. 1, 2020, 130(5): 471-479).*

\* cited by examiner

*Primary Examiner* — Jennifer E Graser
(74) *Attorney, Agent, or Firm* — Meunier Carlin & Curfman LLC

(57) ABSTRACT

The microorganism strain *Pediococcus acidilactici* TAK 589 CoccobEst is a new antimicrobial and antioxidant probiotic, CoccobEst inhibits the growth of the enteropathogens *L. monocytogenes, E. coli, S. enteritidis, S. typhimurium, S. sonnei, S. aureus, E. faecalis* and *C. sakazakii*, but does not inhibit lactobacilli of natural intestinal microbiota. The strain's antimicrobial properties are enhanced by periplasmic peptidoglycan hydrolases with proteolytic activity. CoccobEst is used as a zootechnieai feed additive to prevent bacterial infections in the gastrointestinal tract of farm animals and pets and to prevent and reduce diarrhea. CoccobEst has highly active antioxidant defense system, increasing the redox activity of glutathione and reducing oxidative stress in cells. Therefore, CoccobEst is used as a food supplement or functional food for humans to prevent bacterial infections of the gastrointestinal tract and to prevent and reduce oxidative stress. In addition, CoccobEst is used as a starter culture in fermentation of vegetables.

12 Claims, 3 Drawing Sheets

MICROORGANISM STRAIN *PEDIOCOCCUS ACIDILACTICI* TAK 589 COCCOBEST AS AN ANTIMICROBIAL AND ANTIOXIDANT PROBIOTIC

CROSS REFERENCES

This application is a U.S. national stage application of international patent application number PCT/IB2021/000739 filed on Sep. 17, 2021 claiming priority to Estonian national application P202000014 fled on Sep. 18, 2020.

TECHNICAL FIELD

The present invention relates to the field of biotechnology. The probiotic lactic bacterium of the invention relates to the use for enhancing the natural immunity of a host organism and for the prevention and alleviation of various diseases.

BACKGROUND ART

The United Nations Food and Agriculture Organization (FAO) and the World Health Organization (WHO) define probiotics as living microorganisms that have a favorable effect on the microbiological balance of the gastrointestinal tract when administered in sufficient quantities as dietary supplements or incorporated into functional foods and are therefore beneficial to the health of the host. A functional food or a composition comprises additional components, or biologically active preparations, incl. probiotics, which have health benefits or reduce the risk of illnesses.

The remarkably varied intestinal microbiota of the species and specimens and the interactions with the host change depending on the genetic and environmental factors and illnesses. When the balance of intestinal microbiota is influenced in the desired direction, the resistance to immune, psychological, and metabolic conditions as well as their response to treatment can be enhanced. Administering probiotics promotes the colonization resistance of the intestinal microbiota and resistance to stress and enterogenic infections (Sassone-Corsi et al. 2015. How Beneficial Microbes Cooperate with Immunity to Provide Colonization Resistance to Pathogens. *J Immunol.* 194: 4081-4087).

Most of the probiotics are lactic acid bacteria or lactic acid fermenting bacteria. These include the tetrads forming homofermentative *Pediococcus* genus, that have adapted to a wide range of pH levels, temperatures, and osmotic pressure, and therefore, are capable of colonizing the intestinal tract.

When selecting probiotics that are suitable for administration to humans and animals, the principles of safety, functionality, and technological properties are followed (FAO/WHO 2001. Health and Nutritional Properties of Probiotics in Food Including Powder Milk with Live Lactic Acid Bacteria; EFSA Panel on Additives and Products or Substances used in Animal Feed. 2011. Technical guidance: Tolerance and efficacy studies in target animals. EFSA J. 9:2175).

In regard to safety, it is essential to exclude bacterial strains that are resistant to antibiotics or pathogenic or associated with infectious diseases. At that, the functionality of the isolated strain, i. e. its ability to colonize the intestines, and its biological activity are more important than its origin (Saarela et al. 2000. Probiotic bacteria: safety, functional and technological properties. *J Biotechnol.* 84:197-215). The technological properties include the preservation of the biological activity and sensory properties of the probiotic strain in the course of the production and preservation processes, including ensuring the viability of the probiotics after passing through the intestinal tract.

Problems Caused by Administering Antibiotics to Animals

Animals born in the wild acquire intestinal microbiota from their mothers. Contemporary animal husbandry methods keep the mothers from sufficient contact with their offspring, and therefore, the intestinal microbiota of the young animal might fail to develop quickly enough or to its full extent. This does not provide sufficient protection to new-born animals against pathogens; moreover, stress from the changes in physical and emotional environment, i. e. being separated from their mothers or weaned, makes the young particularly susceptible to infections (Corcionivoschi et al. 2010. The Effect of Probiotics on Animal Health. A review. *J Anim Sci Biotechnol.* 43:1).

In order to prevent infections but also stimulate growth, animal farming has been using antibiotics for decades. As a result, the natural selection and genetic mutations have significantly increased the selection of antibiotic-resistant pathogens and the horizontal transfer of antibiotic resistance genes among farm animals as well as from farmlands into groundwater (FAO. 2016. Probiotics in animal nutrition—Production, impact and regulation by Y. S. Bajagai et al. FAO Animal Production and Health Paper No. 179. Rome; Chee-Sanford et al. 2001. Occurrence and Diversity of Tetracycline Resistance Genes in Lagoons and Groundwater Underlying Two Swine Production Facilities. *Appl Environ Micro-biol.* 67:1494-1502).

The spread of pathogens resistant to antibiotics among farm animals is a threat to human health because they are passed along the food chain and cause serious outbreaks—the outbreaks in Denmark and the USA in the 1990s were directly related to the spread of multidrug-resistant *Salmonella enterica* serovar *Typhimurium* DT104 in pork and quinolone-resistant *Campylobacter jejuni* in poultry (Molbak et al. 1999. An outbreak of multidrug-resistant, quinolone-resistant *S. enterica* Typhimurium DT104. *N Engl J Med.* 341:1420-1425; Smith et al. 1999. Quinolone-resistant *Campylobacter jejuni* infections in Minnesota. 1992-1998 Investigation team. *N Engl J Med.* 340:1525-1532).

Administration of Probiotics in Veterinary Medicine

In accordance with the Regulation (EC) No 1831/2003 of the European Parliament and of the Council, supplementing animal feed with antibiotics for the prevention of diseases (including digestive tract infections) and stimulation of growth is prohibited since 2006. The same regulation classifies probiotics as gut flora stabilizers in zootechnical nutritional additives for various species of animals.

Probiotic additives reduce the abundance of coliforms in the intestinal tract of calves and diarrhoea caused by it as well as increases the intake of the calves, stimulate growth, and reduce morbidity (Wallace and Newbold. 1995. Bacteriology in Animal Feed and Animal Feeding. VCH Verlagsgesellschaft mbH). Moreover, probiotics facilitate the intestinal colonization resistance (Jatkauskas and Vrotniakien. 2010. Effects of probiotic dietary supplementation on diarrhoea patterns, fecal microbiota and performance of early weaned calves. Vet Med Praha. 55:494-503).

Probiotics are more efficient at the early stage of postnatal development of calves (days 7-10) when symptoms of illnesses manifest more frequently and complications can be more serious (Kawakami et al. 2010. Feeding of Lactic Acid Bacteria and Yeast on Growth and Diarrhea of Holstein Calves. *J Anim Vet Adv.* 9:1112-1114). Therefore, it is imperative that the spread of pathogens in the intestines of an animal is inhibited as early as possible after birth.

Administration of Pediococci to Farm Animals as Probiotics

*Pediococcus acidilactici* CNCM MA 18/5M that is administered to piglets and chicken in order to increase their weight is classified as a gut flora stabilizer in the European Union (Commission Implementing Regulation (EU) No 413/2013 of 6 May 2013).

Administering this strain to piglets within the first 42 days after birth has a positive effect on their weight gain and protects the mucosa of the small intestine as well as increases resistance colonization and stress during weaning (Di Giancamillo et al. 2008. Effects of orally administered probiotic *Pediococcus acidilactici* on the small and large intestine of weaning piglets. A qualitative and quantitative micro-anatomical study. *Histol. Histopathol.* 23:651-664).

When administered to chicken, *Pediococcus acidilactici* CNCM MA 18/5M had a positive effect on the weight of eggs, the thickness of shells, the efficiency of feed, the fatty acid composition and cholesterol level of egg yolks, and reduced the number of faulty eggs (Mikulski et al. 2012. Effects of dietary probiotic *Pediococcus acidilactici* supplementation on performance, nutrient digestibility, egg traits, egg yolk cholesterol, and fatty acid profile in laying hens. *Poultry Science,* 91:2691-2700).

Some of the probiotic strains of *Pediococcus acidilactici* have been attributed the ability to regulate the synthesis of protein signaling molecules, thereby reducing inflammatory processes in the body.

*Pediococcus acidilactici* LDTM 5201, isolated from a Korean national dish, inhibits the transcription of IL-8 cytokines that induce inflammatory reaction in the infected area. Moreover, the same strain amplifies the transcription of the mediators of anti-inflammatory reaction, or IL-10 cytokines, in the body when administered through fermented dairy products or as a feed additive (KR 20180117761, Seoul National University R&DB Foundation, 2018). Administering *Pediococcus acidilactici* NRRL B-50517 has a similar inhibiting effect on the development of an inflammatory reaction by increasing the transcription of IL-10 cytokines and M2 macrophages and reducing the transcription of IL-6 and IL-23 cytokines in the body (US 201916266397, Imagilin Technology LLC, 2019).

*Pediococcus acidilactici* is used in several compositions consisting of probiotic bacterial species—which contain additional components that affect digestion, such as inulin, adsorbents, and inhibitors of intestinal peristalsis—for reducing and preventing the instances of diarrhoea in calves (EP 20110711323, Technische Universität München, 2011).

Use of Pediococci in the Fermentation of Plant Matter

Fermentation is one of the easiest methods of vegetable preservation. Adding table salt to chopped vegetables promotes the separation of juice which is a nutrient medium for the developing microbiota. Fermentation requires anaerobic conditions in order to prevent the growth of undesirable microbiota, so any errors in the technology of fermenting vegetables and the effect of micro-organisms present in the natural microbiota of vegetables could lead to soft or slimy final product or color changes in the product (Pudnir and Jain. 2010. Changes in microflora of sauerkraut during fermentation and storage. World J Dairy Food Sci 5:221-225). Several factors limit the use of starter cultures in vegetable fermentation—indigenous microflora of vegetables, 1-2% concentration of table salt, fluctuations in temperature. In addition, a starter culture must not affect the sensory properties of the final product negatively.

The dominant lactic bacteria species in the fermentation of vegetables are *Leuconostoc mesenteroides, Lactobacillus brevis, Pediococcus pentosaceus* and *Lactobacillus plantarum* (Applications of Biotechnology to Traditional Fermented foods. 1992. Report of an ad hoc panel of the board on science and technology for international development. National Academy Press, Washington, D.C.; Plengvidhya et al. 2007. DNA Fingerprinting of Lactic Acid Bacteria in Sauerkraut Fermentations. Appl. Environ. *Microbiol.* 73:7697-7702).

At that, it is known that consuming fermented functional foods prepared from soy beans, turmeric, and the fruits of the *Hovenia* genus trees with *Pediococcus acidilactici* 10B701 and other probiotic strains alleviates the aftereffects of alcohol consumption and supports liver activity in the breakdown of alcohol as well as reduces the risk of liver damage (CN 201910930726, Tianjin Chuangyuan Biotechnology Co., LTD, 2019).

The above demonstrates that *Pediococcus acidilactici* strains with various properties have already been studied and used. However, different strains of the same species do not have identical properties because of intra-species differences due to genetic variations or properties specific to individual strains.

Pediococci that have been isolated from various environments—silage, stool samples, milk, and fermented vegetables and juices—have a strain-specific susceptibility to antibiotics that varies widely (Singla et al. 2018. Antibiotic susceptibility profile of *Pediococcus* spp. from diverse sources. 3 Biotech. 8:489). For example, widespread resistance to common antibiotics was found when testing several strains of *Pediococcus acidilactici* (Daniels et al. 2007. Susceptibility of *Pediococcus* spp. to antimicrobial agents. *J Appl Microbiol.* 102:384-389). Therefore, probiotic bacterial strains that are closely related can differ according to their genotype, phenotype, and functionality (Barros et al. 2001. Phenotypic and Genotypic Characterization of *Pediococcus* Strains Isolated from Human Clinical Sources. *J. Clin. Microbiol.* 39:1241-1246).

The main prerequisite for the manifestation of a particular strain-specific property is the presence of the genes causing it in the cells of the micro-organism (Marteau. 2011. Evidence of Probiotic Strain Specificity Makes Extrapolation of Results impossible from a Strain to Another, Even from the Same Species. Annals of Gastroenterology & Hepatology).

For this reason, there is a need for a strain of *Pediococcus acidilactici* which would have the desired properties and which would be suitable for use in human food and animal feed as well as for the fermentation of plant matter.

DISCLOSURE OF THE INVENTION

The present invention relates to the isolated bacterial strain *Pediococcus acidilactici* TAK 589 Coccobest, the lyophilized form of the strain, a composition comprising the said strain, and the use of the strain as a probiotic additive in food or beverages, a zootechnical feed additive for farm animals and pets, and an additive for functional food or beverage for humans. The object of the invention is to propose a new probiotic bacterial strain with antimicrobial and antioxidative activity that is suitable for the correction and stabilization of the gastrointestinal microbiota, and through that, for the prevention of developing bacterial infections and for the prevention and/or reduction of oxidative stress in the body. In addition, *Pediococcus acidilactici* TAK 589 Coccobest is suitable for use as a technological starter culture in the fermentation of plant matter.

*Pediococcus acidilactici* TAK 589 Coccobest is suitable in the form of a lyophilized culture of micro-organisms for administration as a food additive and preparing functional foods for humans and/or farm animals and pets (incl. fish and birds). Other components in the composition that comprises *Pediococcus acidilactici* TAK 589 Coccobest can include complete milk replacer, milk, starter culture, concentrated feed, premixtures, and other components.

The strain of the present invention can be used for the prevention of bacterial infections in the gastrointestinal tract of humans, farm animals, and pets, and therefore, for the prevention and/o r reduction of diarrhoea. The micro-organisms that cause the aforementioned bacterial infections include *Listeria monocytogenes, Staphylococcus aureus, Escherichia coli, Salmonella enteritidis, Salmonella enterica* serovar *Typhimurium, Shigella sonnei, Enterococcus faecalis* and *Cronobacter sakazakii*.

The antibacterial and antioxidative properties of *Pediococcus acidilactici* TAK 589 Coccobest can be used safely in several fields of biotechnology, including the fermentation of plant matter or in human probiotic dietary supplements.

*Pediococcus acidilactici* TAK 589 Coccobest has been deposited on 23 Sep. 2016 in accordance with the Budapest Treaty on the International Recognition of the Deposit of Microorganisms for the Purposes of Patent Procedure at the Deutsche Sammlung für Mikroorganismen und Zellkulturen GmbH (German Collection of Microorganisms and Cell Cultures GmbH) under the DSM number 32372. The deposit was made to and accepted by the Leibniz Institute DSMZ-German Collection of Microorganisms and Cell cultures located at Inhoffenstraβe 7B 38124 Braunschweig, Germany.

Morphological Properties

The strain of *Pediococcus acidilactici* TAK 589 Coccobest was isolated from a stool sample of a healthy calf during a study of gastrointestinal microbiota by culturing the diluted fecal matter of the calf ($10^{-2}$-$10^{-7}$) in a saline solution (0.9% NaCl) and seeding it on the de Man-Rogosa-Sharpe (MRS) agar (OXOID, UK) which was incubated in the IG 150 incubator (Jouan, France) in a microaerobic environment (10/5/85 $CO_2/O_2/N_2$) for 48 hours at 37° C. The cultivated microbial colonies were described, counted, and the total quantity of micro-organisms determined. *Pediococcus acidilactici* TAK 589 Coccobest is a gram-positive coccus with cells that form pairs or tetrads.

Physiological and Biochemical Properties

*Pediococcus acidilactici* TAK 589 Coccobest can be cultivated by incubation in the MRS broth in a microaerobic environment for 24-48 hours, which results in uniformly turbid growth. Following cultivation in the MRS agar culture medium in microaerobic environment at 37° C. for 48 hours (10/5/85 $CO_2/O_2/N_2$), the microbial colonies have a diameter of 1.5-2.5 mm, regular edges, and are greyish-white and convex. The optimal growth temperature of the strain is from 37° C. to 45° C.; the strain can also multiply at 7° C. and 15° C. The optimal pH level of the culture medium is 6.5.

TAK 589 Coccobest strain was identified as *Pediococcus acidilactici* based on its biochemical activity by using the API CHL 50 (bioMérieux, France) medium for determining the fermentation profile of carbohydrates and Maldi Biotyper mass spectrometer (Bruker Daltonik, Germany). The strain ferments: L-arabinose, ribose, D-xylose, D-galactose, D-glucose, D-fructose, D-mannose, L-rhamnose, N-acetyl-glucosamine, amigdalin, arbutin, aesculin, salicin, cellobiose, D-trehalose, gentiobiose, tagatose, sodium gluconate.

Genomic and Molecular Properties

DNA fragments from the samples obtained by whole genome sequencing (Omega Bioservices, USA) of *Pediococcus acidilactici* TAK 589 Coccobest were sorted according to the Phred quality score (<20) and length (<40 bp) by using PRINSEQ web software (Schmieder and Edwards. 2011. Quality control and preprocessing of metagenomic datasets. Bioinformatics, 27:863-864.). PATRIC software, which is based on the RAST server, was used to fully assemble and annotate the genome from the samples that passed the quality control (Brettin el al. 2015. RASTtk: a modular and extensible implementation of the RAST algorithm for building custom annotation pipelines and annotating batches of genomes. Sci Rep. 5:8365). Based on the results, the nucleotide structure of the *Pediococcus acidilactici* TAK 589 Coccobest genome was determined and 1.947 protein coding DNA sequences were identified (Table 1).

TABLE 1

Nucleotide characteristics of TAK 589 Coccobest

| Characteristic | Value |
|---|---|
| Genome length (bp) | 1,979,519 |
| Contigs | 1 |
| % of GC | 42 |
| CDS | 1,947 |
| tRNA | 53 |
| rRNA | 5 |

The 1,947 protein coding sequences identified during the annotation of the genome were aligned against the orthologous genes in the database based on the COG server (Tatusov. 2000. The COG database: a tool for genome-scale analysis of protein functions and evolution. *Nucleic Acids Res.* 28:33-36); 1,677 sequences were classified according to function into 19 larger categories (Table 2).

TABLE 2

Classification of coding sequences of TAK 589 Coccobest

| OG class | Name | Number | Weight (%) |
|---|---|---|---|
| C | Energy production and conversion | 76 | 4.53 |
| D | Control and mitosis of cell cycles | 17 | 1.01 |
| E | Amino acid metabolism and transport | 91 | 5.43 |
| F | Nucleotide metabolism and transport | 87 | 5.19 |
| G | Carbohydrate metabolism and transport | 218 | 13.0 |
| H | Coenzyme metabolism and transport | 38 | 2.27 |
| I | Lipid metabolism and transport | 42 | 2.50 |
| J | Translation, ribosome structure and biosynthesis | 140 | 8.35 |
| K | Transcription | 154 | 9.18 |
| L | Replication, recombination, and damage repair | 98 | 5.84 |
| M | Cell wall and membrane biosynthesis | 99 | 5.90 |
| N | Cell mobility | 3 | 0.18 |
| O | Post-translational modification, protein transport, and chaperones | 48 | 2.86 |
| P | Inorganic ion transport and metabolism | 65 | 3.88 |
| Q | Metabolite biosynthesis and transport | 17 | 1.01 |
| S | Function unknown | 361 | 21.5 |
| T | Signal transmission | 46 | 2.74 |
| U | Intracellular circulation, secretion, and vesicle transport | 20 | 1.19 |
| V | Defence mechanism | 57 | 3.40 |
| | Total | 1,677 | |

Gene sequences of periplasmic peptidoglycan hydrolase (PGH) were identified in the genome of *Pediococcus acidilactici* TAK 589 Coccobest, the enzyme sites of which have proteolytic activity and inhibit the growth of a wide range of micro-organisms in vitro (Sharma er al. 2016. Prediction of peptidoglycan hydrolases—a new class of antibacterial proteins. BMC Genomics. 17:1; Garcia-Cano et al. 2011. Detection, cellular localization and antibacterial activity of two lytic enzymes of *Pediococcus acidilactici* ATCC 8042. *J Appl Microbiol*. 111: 607-615).

The identified PGH sequence (GenBank AKD44141.1) was aligned against the NCBI Conserved Domains Database, thereby ascertaining two active sites, determined in the course of earlier studies. The first belongs in the family of proteins that recognize the peptidoglycane layer, i.e. it is capable of extracellular hydrolysis of peptidoglycan by disrupting the bonds between the amides of the cell membrane. The second active site belongs in the super-family of glucosaminidase with a similar effect (Marchler-Bauer et al. 2016. CDD/SPARCLE: functional classification of proteins via subfamily domain architectures. *Nucleic Acids Res.* 45:D200-D203).

Therefore, *Pediococcus acidilactici* TAK 589 Coccobest contains at least two lytic enzymes with active sites that promote the antibacterial activity of the strain in question. The inhibiting effect on the growth of micro-organisms that is attributed to the PGH enzymes described above has been demonstrated in vitro and the antimicrobial properties of the present invention in vivo. In both instances, the transmission of antibacterial effect against several wide-spread pathogens has been demonstrated, incl. against *Listeria monocytogenes, Salmonella enterica* serovar *Typhimurium, Staphylococcus aureus, Enterococcus faecalis* and *Escherichia coli*.

Susceptibility to Antibiotics

The antibacterial susceptibility of *Pediococcus acidilactici* TAK 589 Coccobest to antibiotics was tested in accordance with the ISO 10932 standard using VetMIC™ panels (SVE, Sweden). The minimum inhibiting concentration was determined according to the epidemiological cut-off values recommended by the European Food Safety Authority (EFSA) and compared to other pediococci of animal origin in the BioCC microbial culture collection (Table 3). A microbial strain is considered susceptible when it is inhibited at an equal or lower concentration to the cut-off value of the specific antimicrobial compound (S≤xmg/L). A microbial strain is considered resistant when it is inhibited at a higher concentration than the cut-off value of the specific antimicrobial compound (R>xmg/L).

The strain of *Pediococcus acidilactici* TAK 589 Coccobest was not resistant to the antibiotics used in the study. Therefore, it can be considered a criterion of being highly safe compared to several other *P. acidilactici* strains which have been tested and found to be resistant to common antibiotics (Daniels et al. 2007. Susceptibility of *Pediococcus* spp. to antimicrobial agents. *J Appl Microbiol*. 102: 384-389)

TABLE 3

Antimicrobial susceptibility of the TAK 589 Coccobest compared to two pediococci

| Antimicrobial agent | Reference (mg/L) | Cut-off value[a] (mg/L) | | |
|---|---|---|---|---|
| | | TAK 589 | TAK 551 | TAK 569 |
| Ampicillin | 4 | 1 | 1 | 1 |
| Gentamicin | 16 | 2 | 4 | 2 |
| Kanamycin | 64 | 32 | 128 | 64 |
| Streptomycin | 64 | 8 | 64 | 32 |
| Erythromycin | 1 | 0.03 | 0.25 | 0.25 |
| Clindamycin | 1 | 0.03 | 0.06 | 0.12 |
| Tetracycline | 8 | 2 | 64 | 32 |
| Chloramphenicol | 4 | 1 | 8 | 8 |

[a]Guidance on the assessment of bacterial susceptibility to antimicrobials of human and veterinary importance. EPSA Journal. 2012. 10(6): 2740

Antibacterial Properties

The antimicrobial effect of various *P. acidilactici* strains against pathogens can vary widely. For example, the strain QC38 has been demonstrated to have a low inhibitory effect against *E. coli* and *S. enterica* serovar *Typhimurium* and an intermediate inhibitory effect against the growth of *S. aureus* (Morales-Estrada et al. 2016. Partial Characterization of Bacteriocin Produced by Halotolerant *Pediococcus acidilactici* Strain QC38 Isolated from Traditional Cotija Cheese. Pol J Microbiol. 65: 279-285). At the same time, the suppressive effect of the strain of the present invention against these pathogens is strong.

Based on in vivo research results. *Pediococcus acidilactici* TAK 589 Coccobest inhibits pathogenic micro-organisms. Such enteropathogens include *Listeria monocytogenes, Escherichia coli, Salmonella enteritidis, Salmonella enterica* serovar *Typhimurium, Shigella sonnei, Staphylococcus aureus, Enterococcus faecalis* and *Cronobacter sakazakii* (Example 1). In order to assess the antimicrobial properties of *Pediococcus acidilactici* TAK 589 Coccobest against pathogens, streak line method was used (Hütt et al. 2006. Antagonistic activity of probiotic lactobacilli and bifidobacteria against entero- and uropathogens. *J Appl Microbiol*. 100:1324-32). In order to measure the antagonistic activity against target micro-organisms, the width of the inhibition zone was measured in millimeters, and arithmetic mean and standard deviation were calculated based on the results of the sample that was used, and based on that, the antagonistic activity of strains was assessed.

*Pediococcus acidilactici* TAK 589 Coccobest strain had strong antagonistic properties against the selected pathogens after 24 to 48 hours of incubation; however, the strain does not suppress the lactobacilli that belong in the natural intestinal microbiota (Table 4 and 5).

TABLE 4

Antimicrobial activity of TAK 589 Coccobest[a]

| | Growth inhibition zone (mm) | |
|---|---|---|
| Pathogen | Microaerobic environment | Anaerobic environment |
| *Listeria monocytogenes* ATCC 51774 | 13.9 ± 0.4 | 7.3 ± 0.6 |
| *Escherichia coli* ATCC 25922 | 14.0 ± 1.0 | 6.1 ± 0.5 |
| *Salmonella enteritidis* ATCC 13076 | 13.2 ± 1.0 | 5.5 ± 0.5 |
| *Salmonella enterica* serovar *Typhimurium* | 12.5 ± 0.9 | 5.9 ± 0.6 |
| *Shigella sonnei* ATCC 25931 | 13.5 ± 0.4 | 7.0 ± 0.5 |
| *Escherichia coli* DSM 1576 | 11.2 ± 1.0 | 6.1 ± 0.8 |
| *Cronobacter sakazakii* ATCC 51329 | 14.5 ± 0.9 | 6.0 ± 0.8 |

[a]Modified MRS agar in microaerobic (10% $CO_2$) and anaerobic (5/90/5 $CO_2/O_2/N_2$) environments after 24 hours of incubation.
Growth inhibition zone in a microaerobic environment: low <9.9; intermediate 10.0-12.9; high >13 (mm).
Growth inhibition zone in an anaerobic environment: low <4.9; intermediate 5.0-5.9; high >6 (mm).

TABLE 5

Antimicrobial activity of TAK 589 Coccobest[b]

| Pathogen | Growth inhibition zone (mm) | |
|---|---|---|
| | Microaerobic environment | Anaerobic environment |
| Lactobacillus spp. | 2.90 ± 0.4 | 4.70 ± 0.9 |
| Listeria monocytogenes ATCC 51774 | 34.0 ± 0.1 | 20.8 ± 1.0 |
| Enterococcus fecalis ATCC 29212 | 27.2 ± 2.5 | 18.3 ± 0.5 |
| Salmonella enteritidis ATCC 13076 | 23.3 ± 1.1 | 20.3 ± 0.5 |
| Salmonella enterica serovar Typhimurium | 21.9 ± 1.5 | 20.5 ± 0.6 |
| Staphylococcus aureus ATCC 25923 | 16.9 ± 2.5 | 19.8 ± 0.5 |
| Escherichia coli ATCC 25922 | 23.1 ± 1.4 | 20.5 ± 0.6 |
| Cronobacter sakazakii ATCC 51329 | 23.3 ± 1.0 | 22.0 ± 0.8 |

[b]On modified MRS agar in microaerobic (10% $CO_2$) and anaerobic (5/90/5 $CO_2/O_2/N_2$) environments after 48 hours incubation.
Growth inhibition zone in a microaerobic environment: low <9.9; intermediate 10.0-12.9; high >13 (mm).
Growth inhibition zone in an anaerobic environment: low <7.9; intermediate 8.0-12.9; high >13 (mm).

Antioxidative Properties

Oxidative stress in the body is caused by factors that promote chain reactions of free radicals, i. e. pro-oxidants. The continuous uncontrolled formation and effect of pro-oxidants causes oxidative damage to lipids, proteins, nucleic acids, and carbohydrates, being one of the causes of many illnesses (heart attack, stroke, atherosclerosis, cancer). Among all else, the pro-oxidants include reactive oxygen species, the build-up of which is one of the main reasons for cell damage.

Antioxidants are enzymes or substances which can inhibit or prevent the formation of pro-oxidants and chain reactions starting from very low concentrations. Both specific antioxidative enzymes as well as antioxidative substances affect the body (e. g. glutathione). In addition, antioxidants are absorbed from food. Antioxidative protection needs additional support in polluted and stressful environments. Among all else, antioxidants are released into the bloodstream due to the functions of intestinal probiotics.

Gene sequences of antioxidative enzymes and transcription factors were identified in the genome of Pediococcus acidilactici TAK 589 Coccobest. These included NADH peroxidase (EC 1.11.1.1), hydrogen peroxide stress response regulator (PerP), thioredoxin (Trx), thioredoxin reductase (EC 1.8.1.9), glutathione reductase (EC 1.8.1.7), thiol peroxidase (EC 1.11.1.15), methionine sulfoxide reductases A and B (EC 1.8.4.11 and EC 1.8.4.12), coenzyme A disulfide reductase (EC 1.8.1.1), manganese catalase (EC 1.11.1.6) etc.

In order to assess the effect of the antioxidative enzymes that were identified, they were tested in vitro and compared with other pediococci from animal origin in the BioCC microbial culture collection (Table 6).

Pediococcus acidilactici TAK 589 Coccobest strain was cultivated in the MRS broth for 24 hours and centrifuged for 5 minutes at 10000×G at 4° C.; subsequently, supernatant was removed and the result suspended in 1 ml MQ water. The density of the suspension was $10^9$ bacterial cells per milliliter at $OD_{600}$ 1.1. In order to obtain a lysate, a lysis buffer (Qiagen, Holland) containing SDS (CAS #151-21-3) was added to the suspension and bacterial cells were disrupted mechanically at room temperature for 15 minutes.

Total antioxidant activity (TAA) was determined with a commercial kit (Cayman Chemicals, USA). The method is based on the oxidization of ABTS (CAS #28752-68-3) by metmyoglobins and the quantification of inhibiting antioxidants in the sample. The absorbance of the samples and standards was measured with a Synergy HTX spectrophotometer (BioTek, USA) at the wavelength of 750 nm.

The oxidized (GSSG) and reduced (GSH) glutathione was determined with a colorimetric kit (Invitrogen. USA). The samples were treated with a 5% benzoic acid (CAS #97-05-2) for the removal of proteins from the lysate. The free glutathione and other thiols were blocked with 2-vinylpyridine (CAS #100-69-6) for the quantification of the oxidized glutathione. The absorbance of samples and standards was measured with a Synergy HTX spectrophotometer at the wavelength of 405 nm.

Hydrogen peroxide was determined with a colorimetry kit (Thermo Scientific, USA). The method is based on the oxidization of Mohr's salt (CAS #24389-93-3) by hydrogen peroxide while being enhanced by sorbitol (CAS #50-70-4). The oxidized Mohr's salts bind to xylenol (CAS #1611-35-4) in the sample. The absorbance of samples and standards was measured with a Synergy HTX spectrophotometer at the wavelength of 595 nm.

The results demonstrate low hydrogen peroxide content in the samples containing Pediococcus acidilactici TAK 589 Coccobest strain in the environments that contained living cells as well as in cell-free environments (Table 6). $H_2O_2$ is a precursor to the formation of active radicals in the body, diffusing through cellular structures and being a strong oxidizing agent in an acidic environment.

The reduced glutathione level, measured in the cell-free environment, was the highest with the Pediococcus acidilactici TAK 589 Coccobest strain, being one of the most important traps for the reactive oxygen species. The redox activity of glutathione, its ability to inhibit autoxidation, and to retain the reduced form is the most important redox buffer in cells. Changes in the forms of glutathione directly affect the antioxidative activity of the cell (Smirnova and Oktyabrsky. 2005. Glutathione in Bacteria. Biokhimiya 70:1199-211). At that, the ratio of GSSG/GSH—the indicator of oxidative stress in a cell—is the lowest in case of the Pediococcus acidilactici TAK 589 Coccobest strain, compared to other pediococci from animal origin in the BioCC microbial culture collection.

In addition, the measured total antioxidative activity is the highest in the cell lysate of Pediococcus acidilactici TAK 589 Coccobest (Table 6).

TABLE 6

The antioxidative activity of TAK 589 Coccobest compared to other pediococci

| | | TAK 589 | TAK 551 | TAK 569 |
|---|---|---|---|---|
| Whole cells | TAA[a] (mM) | 1.59 | 2.90 | 1.54 |
| | $H_2O_2$ (μg/mL) | 161 | 269 | 152 |
| Lysate | TAA (mM) | 0.18 | 0.01 | 0.02 |
| | $H_2O_2$ (μg/mL) | 131 | 140 | 137 |
| | GSH[b] (μM) | 8.05 | 7.38 | 7.66 |
| | GSSG[c] (μM) | 3.05 | 3.78 | 3.95 |
| | GSSG/GSH[d] | 0.38 | 0.51 | 0.52 |

[a]TAA - total antioxidative activity
[b]GSH - reduced glutathione
[c]GSSG - oxidized glutathione
[d]GSSG/GSH - the redox ratio of glutathione Preservation of Biological Activity When using powder for preparing complete milk replacer feed (MRF) for calves, it is diluted in water at 40-50° C., which is why the ability of the probiotic strain to maintain its biological activity at higher temperatures is essential.

In order to demonstrate this, an experiment was conducted with lyophilized *Pediococcus acidilactici* TAK 589 Coccobest culture, which was stirred into diluted buttermilk and heated for 20 minutes at 85° C. After heating, it was immediately seeded onto the MRS agar and incubated for 48 hours at 37° C., after which the microbial wells were counted. In the course of the experiment, it was discovered that the number of *Pediococcus acidilactici* TAK 589 Coccobest does not change when heated for 10-20 minutes at 60° C. and decreases by one logarithm at 70° C. (FIG. 1).

In addition to the temperature used in food processing, maintaining the biological activity during a longer period at various temperatures is important for storing the strain of a probiotic lactic acid bacterium. For the preservation challenge test lasting 36 months, the *Pediococcus acidilactici* TAK 589 Coccobest culture was used as a lyophilized powder (Table 7).

Ability to Colonize the Intestine

The ability of *Pediococcus acidilactici* TAK 589 Coccobest to pass the gastrointestinal tract was demonstrated as part of an experiment conducted in Estonia with 32 Holstein female calves (Example 3). New-born calves were divided into test and control groups and fed with six liters of a mixture of milk from the local farm and a complete milk replacer feed (MRF) prepared with powder from day 4 until day 16 after birth. *Pediococcus acidilactici* TAK 589 Coccobest probiotic bacterial strain was added to the MRF that was fed to the calves in the test group. Stool samples were collected from the rectum of the calves with a gloved hand into sterile cups at the end of the first and the second week and stored at −20° C. and later at −80° C.

The amount of *Pediococcus acidilactici* TAK 589 Coccobest was measured in the stool samples collected from the calves with the qPCR method by using strain-specific prim-

TABLE 7

Biological activity preservation challenge test of the TAK 589 Coccobest[a]

| Conditions (° C.) | Sample 0 | 2 weeks | 1 month | 3 months | 6 months | 12 months | 24 months | 36 months |
|---|---|---|---|---|---|---|---|---|
| +37 ± 1 | $2.1 \times 10^{10}$ | $1.1 \times 10^{10}$ | $1.5 \times 10^{10}$ | — | — | — | — | — |
| +25 ± 1 | $2.1 \times 10^{10}$ | $1.8 \times 10^{10}$ | $2.3 \times 10^{10}$ | $1.2 \times 10^{10}$ | $8.2 \times 10^{9}$ | — | — | — |
| +4 ± 2 | $2.1 \times 10^{10}$ | — | $2.1 \times 10^{10}$ | $1.5 \times 10^{10}$ | $3.7 \times 10^{10}$ | $1.0 \times 10^{10}$ | $1.4 \times 10^{10}$ | — |
| −18 ± 3 | $2.1 \times 10^{10}$ | — | — | — | $2.6 \times 10^{10}$ | $1.9 \times 10^{10}$ | $1.8 \times 10^{10}$ | $4.4 \times 10^{10}$ |

[a] In accordance with (modified) ISO 15214: 1998 standard.

In addition, the biological activity of the *Pediococcus acidilactici* TAK 589 Coccobest strain was tested in the acidic environment of the stomach and in contact with bile acid. The strain was cultured in the MRS broth in a microaerobic environment (10/5/85 $CO_2/O_2/N_2$) for 24 hours at 37° C. Three more MRS broths were prepared for determining the resistance to the bile and gastric acids: 3 g/L of bile extract (Sigma, USA) was added to the first and 1M HCl solution to the second until the pH level of the environment was 3, and finally, 3 g/L pepsin (EC 3.4.23.1; Sigma, USA) was added to the third in addition to 1 M HCl solution to achieve the pH level of 2 in the environment. A previously cultivated bacterial culture was added to the modified MRS broths, followed by incubation at 37° C. in a microaerobic environment.

The survivability of the *Pediococcus acidilactici* TAK 589 Coccobest strain was demonstrated with hourly seedings (Table 8).

ers and a gene probe. DNA was extracted from the stool samples according to the protocol of QIAamp DNA Stool Mini Kit (Qiagen, Germany). The concentration of DNA was checked with a Synergy HTX spectrophotometer (BioTek, USA). In order to determine the strain of *Pediococcus acidilactici* TAK 589 Coccobest, an aliquot of each calf's DNA sample was prepared with a concentration of 10 ng/µL and a final volume of 35 µL. For the amplification of DNA, strain-specific primers and a TaqMan diagnostic gene probe were designed for the region of the gene sequence essential for the activity of a bacterium—BioY (WP_002832434.1), a transporter protein belonging to the biotin biosynthesis chain, which is strain-specific to the *Pediococcus acidilactici* TAK 589 Coccobest (Table 9).

TABLE 8

The resistance test of the TAK 589 Coccobest to bile acid and acidic environment

| Conditions | Number of bacteria (CFU/g) | | | | |
|---|---|---|---|---|---|
| | Sample 0 | 1 hour | 2 hours | 3 hours | 4 hours |
| MRS + bile acid 0.3% (n = 3) | $1.93 \times 10^{9}$ ± 0.16 | $1.93 \times 10^{9}$ ± 0.16 | $1.97 \times 10^{9}$ ± 0.16 | $1.93 \times 10^{9}$ ± 0.12 | $2.07 \times 10^{9}$ ± 0.11 |
| MRS + HCl → pH 3 (n = 2) | $2.75 \times 10^{8}$ ± 0.07 | $1.5 \times 10^{8}$ ± 0.28 | $1.04 \times 10^{8}$ ± 0.08 | $9.2 \times 10^{7}$ ± 0.57 | $8.7 \times 10^{7}$ ± 0.14 |
| MRS + HCL + pepsin → pH 2 (n = 3) | $1.63 \times 10^{9}$ ± 0.11 | $4.37 \times 10^{4}$ ± 0.38 | $1.8 \times 10^{2}$ ± 0.18 | $1.83 \times 10^{2}$ ± 0.33 | $1.73 \times 10^{2}$ ± 0.19 |
| Control | $2.0 \times 10^{9}$ | $2.0 \times 10^{9}$ | $2.2 \times 10^{9}$ | $2.2 \times 10^{9}$ | $2.2 \times 10^{9}$ |

TABLE 9

Molecular properties of the strain-specific primers and TaqMan gene probe

| Oligo-nucleotide | 5'→3' | Tm[a] (C. °) | GC (%) | Hairpin[b] (ΔG) | Dimer[c] ΔG) |
|---|---|---|---|---|---|
| Forward | TTTAAGGCAGTACTTGCAAACG | 61.8 | 40.9 | -2.9 | -10.94 |
| TaqMan | TCCGCTTTAGTGGCGTTGATAGGACGA | 70.3 | 51.9 | -3.05 | -6.75 |
| Reverse | GGGAGCTGGTCTTGACTAAAT | 61.7 | 47.6 | -0.32 | -6.34 |

Oligonucleotides were designed with the PrimerQuest Tool software (Integrated DNA Technologies, USA).
[a]Melting temperature reflecting the stability of the nucleic acid duplex
[b]Internal complementary segments mating with themselves
[c]Internal complementary segments forming dimers 2 μL of the DNA aliquot (~20 ng) that was used for the qPCR reaction was dried down, i.e. DNA was pipetted onto a microplate and dried under sterile conditions overnight. Then, 20 μL of the previously prepared reaction mixture was added to each sample. Two blanks were added to the plate to control for the purity of the assay and possible false positives. The reaction mixture per sample contained the following components:

- 4 μL PrimeTime® Mini qPCR Assay (Integrated DNA Technologies, USA)
- 4 μL 5×HOT FIREPol® Probe qPCR Mix (Solis BioDyne, Estonia)
- 12 μL MQ deionized H$_2$O A QuantStudio thermo-cycler (Thermo Fisher Scientific, USA) was used for the qPCR reaction. QuantStudio Design and Analysis Software (Thermo Fisher Scientific, USA) was used for reading the PCR plates and analysing the results. The conditions for the qPCR reaction were as follows:

| | | | |
|---|---|---|---|
| Polymerase activation | 95° C. | 10 min | |
| Denaturation | 95° C. | 15 s | 35 cycles |
| Binding/elongation | 60° C. | 50 s | |
| Inactivation | — | 2 min | |

*Pediococcus acidilactici* TAK 589 Coccobest in the stool samples that were collected from the calves was tested with the help of the fluorescence created by TaqMan strain-specific gene probe. During the PCR, primers and gene probes bind in a strain-specific manner by mating or mismatching in a specific sequence. The gene probe is bound to a fluorophore at the 5' end and a quencher at the 3' end. Quencher is active only while in the vicinity of a fluorophore. When a new DNA strand is synthesized, the fluorophore at the 5' end of the gene probe is released. With each new cycle, fluorophore is released in proportion to the number of amplicons. This results in an increasingly strong fluorescence which enables quantifying the strain-specific amplicons in the reaction mixture. The cycle threshold is recorded when the threshold value of the fluorescence is exceeded. The specificity of the diagnostic gene probe to the *Pediococcus acidilactici* TAK 589 Coccobest strain was assessed with a control sample that contained genomic DNA and the reaction mixture.

The presence of the *Pediococcus acidilactici* TAK 589 Coccobest strain was tested in the stool samples of the calves in the test group in weeks I and II after birth in nine samples out of 10 and seven samples out of 11 respectively (Table 10). The presence of the strain in the stool samples of the control group calves was tested in one sample out of 13 in week I and one sample out of 7 in week II. Therefore, it is possible to state that *Pediococcus acidilactici* TAK 589 Coccobest is capable of successful colonization of the intestines of calves.

TABLE 10

Results of the qPCR reaction with a strain-specific primer

| Species | Strain | Origin of isolation | C$_t$[a] |
|---|---|---|---|
| *Pediococcus acidilactici* | TAK 589 | Calf stool | 18.6 |

| | | | C$_t$ | |
|---|---|---|---|---|
| Sample of calves | | Stool samples[b] | x̄[c] | M$_e$[d] |
| Test group | Week I | 9/10 | 31.8 | 32.3 |
| | Week II | 7/11 | 33.2 | 33.1 |
| Control group | Week I | 1/13 | 34.5 | |
| | Week II | 1/7 | 33.6 | |

[a]Cycle threshold where the fluorescent signal of the reaction exceeds the threshold value
[b]The number of amplified/all samples in the group
[c,d]The arithmetic mean and median of the results

DESCRIPTION OF EMBODIMENTS

Example 1. Antagonistic Effect on Pathogenic Micro-Organisms

Objective: Testing the antagonistic properties of *Pediococcus acidilactici* TAK 589 Coccobest against the most common pathogenic micro-organisms.

Method: In order to assess the antagonistic properties of *Pediococcus acidilactici* TAK 589 Coccobest against pathogens, the streak line method was used; the growth inhibition zone of pathogens caused by the TAK 589 Coccobest and *Pediococcus* spp. control strains was measured in millimeters (Hütt et al. 2006. Antagonistic activity of probiotic lactobacilli and bifidobacteria against entero- and uropathogens. *J Appl Microbiol.* 100: 1324-1332).

The antagonistic activity of *Pediococcus* spp. strains was assessed in regard to eight pathogen strains in different environments: *Listeria monocytogenes* ATCC 51774; *Escherichia coli* ATCC 25922; *Salmonella enteritidis* ATCC 13076: *Salmonella enterica* serovar *Typhimurium; Shigella sonnei* ATCC 25931; *Staphylococcus aureus* ATCC 25923; and *Enterococcus faecalis* ATCC 29212. First. *Pediococcus acidilactici* TAK 589 Coccobest was cultivated in an IG 150 incubator (Jouan, France) for 24 hours in MRS (Oxoid. UK) in microaerobic (10% $CO_2$) environment at 37° C. The pathogenic strains were grown for 24 hours on agar supplemented with blood in aerobic environment at 37° C. In order to assess the antimicrobial properties, 20 μL of five different *Pediococcus* strains, cultivated for 24 hours, were cultured onto modified MRS agar medium (does not contain triammonium sulphate $C_6H_{17}O_7N_3$ and sodium acetate $C_2H_9O_5Na$) along the middle line and cultivated in microaerobic and anaerobic (5/90/5 $CO_2/O_2/N_2$) environments simultaneously at 37° C. The pathogen strains that were going to be tested were seeded in two perpendicular lines in opposite directions and incubated for 24 hours in microaerobic and anaerobic environments at 37° C. The growth-free zone was measured to determine the inhibition of pathogens. The control strains of *Pediococcus* spp. isolated from the intestines and belonging in the BioCC microbial culture collection were used as a basis for comparison.

Figure 1:
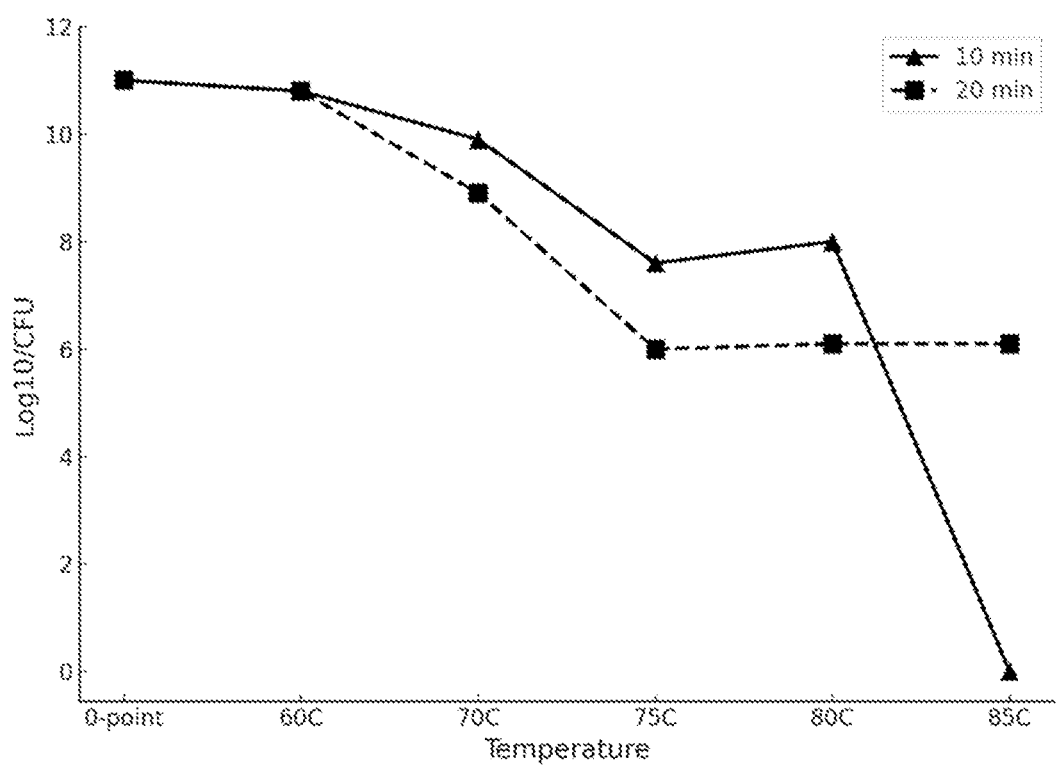
FIG. 1. The survival of *Pediococcus acidilactici* TAK 589 Coccobest in log 10 system in diluted buttermilk when incubated at high temperatures for 10 to 20 minutes.
Figure 2:
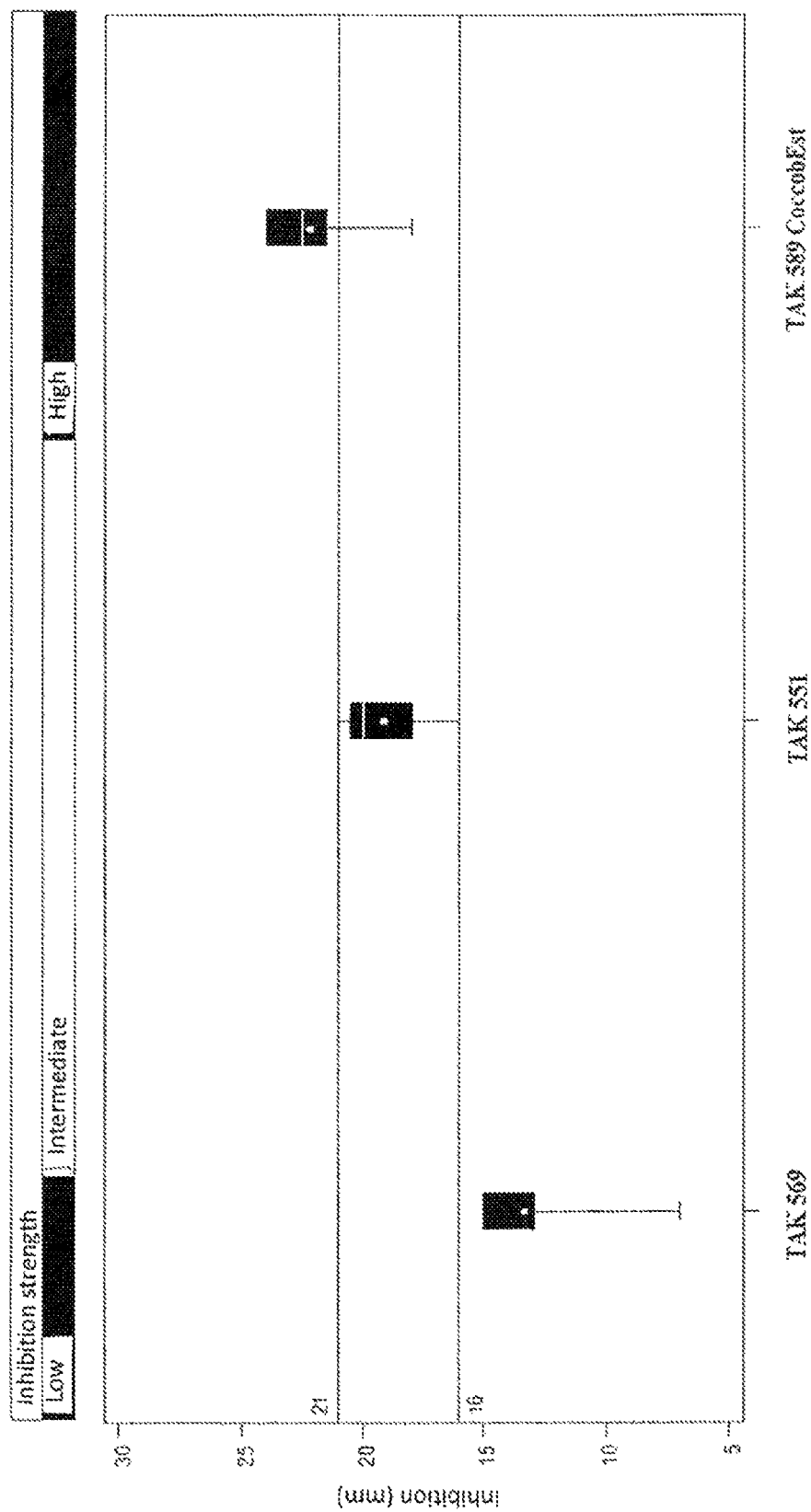
FIG. 2. Inhibition in anaerobic environment. The antimicrobial effect of the *Pediococcus acidilactici* TAK 589 Coccobest on pathogens compared to the control strains of *Pediococcus* spp. isolated from the intestine. On the modified MRS agar using the streak line method in anaerobic (5/90/5 CO2/O2/N2) environment after 24 hours of incubation (growth suppression of the target micro-organisms in mm).
Figure 3:
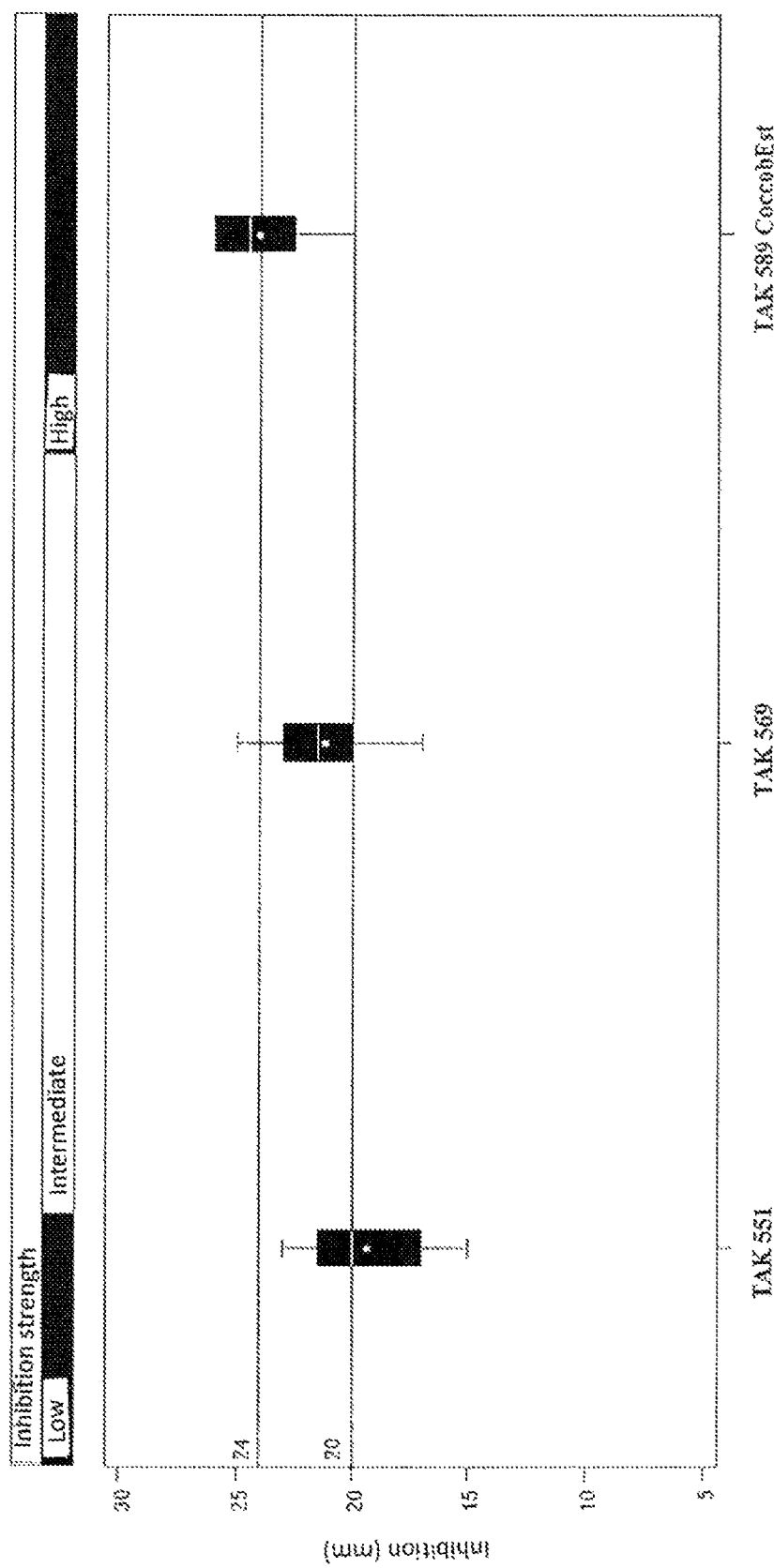
FIG. 3. Inhibition in microaerobic environment. The antimicrobial effect of the *Pediococcus acidilactici* TAK 589 Coccobest on pathogens compared to the control strains of *Pediococcus* spp. isolated from the intestine. On the modified MRS agar using the streak line method in microaerobic (10% CO$_2$) environment after 24 hours of incubation (growth suppression of the target micro-organisms in mm).

Results: *Pediococcus acidilactici* TAK 589 Coccobest had the strongest inhibitory properties against the growth of pathogens in microaerobic and anaerobic environments; the effect of other strains was intermediate or low (FIG. 2, FIG. 3).

Example 2. The Effect of Administration to Calves (Experiment 1)

Objective: Studying the effect of *Pediococcus acidilactici* TAK 589 Coccobest on the intestinal microbiota of calves and on the incidence of diarrhoea.

Method: The experiment included 8 Estonian male calves of Holstein breed. New-born calves were divided into test and control groups (both groups: n=4). The calves in the test group received *Pediococcus acidilactici* TAK 589 Coccobest as an aqueous solution prepared with lyophilized powder in a daily dose of $1\times10^{10}$ CPU from the first day until the calves were five days old. Stool samples were collected from the calves on days 2 and 5 of their life, and additionally, on day 8 after birth in order to assess the aftereffects. Stool samples were collected from the rectum with gloved hands into sterile cups which were stored at −20° C. and later at −80° C. The total quantity of lactobacilli and the quantity of *E. coli* and coliform micro-organisms were measured in the samples. In addition, the incidence of diarrhoea and general health indicators were assessed according to health scoring criteria (University of Wisconsin-Madison, School of Veterinary Medicine, Calf Health Scoring Chart and Calf Health Scoring Criteria).

Results: The control group had seven samples out of 16 positive for diarrhoea (44%) and the test group three samples out of 16 (19%). Administering *Pediococcus acidilactici* TAK 589 Coccobest reduced the quantity of *E. coli* in the stool samples of the test group by 1.6 logarithms by day 5 and 2.5 logarithms by day 8 after birth. The quantity of coliform micro-organisms reduced in the test group stool samples by 0.3 logarithms by day 5 and 0.8 logarithms by day 8. At the same time, the quantity of lactobacilli did not decrease in the stool samples of the test group.

Example 3. The Effect of Administration to Calves (Experiment 2)

Objective: Studying the effect of *Pediococcus acidilactici* TAK 589 Coccobest on the intestinal enterobacterial microbiota of calves and the incidence of diarrhoea.

Method: The experiment included 32 Estonian female calves of Holstein breed. New-born calves were divided into test and control groups (both groups: n=16) and were given colostrum for the first three days of their lives. After the day 3 and until day 16, the calves were given a mixture of milk from a local farm and complete milk replacer feed (MRF), prepared with MRF powder (20% fat, 22% protein, 47.6% lactose, and 16.4% casein) with a ratio of 140 g to 890 mL of warm water (40° C.). Starting from day 17, calves were given only MRF to drink. *Pediococcus acidilactici* TAK 589 Coccobest ($1.2-3.2\times10^7$ CFU/mL) was added to the MRF of the calves in the test group starting from day 3.

Between days 4 and 10, the calves received 6 liters of MRF per day, and after that, 8 liters a day until being weaned (approximately on day 70). During the experiment, a veterinarian recorded the consistency of the calf stool daily according to stool assessment criteria (University of Wisconsin-Madison, School of Veterinary Medicine, Calf Health Scoring Chart and Calf Health Scoring Criteria). There were no differences in the birth weight and Ig levels between the test and control group calves (Table 11). Calf stool samples were collected from the rectum on days 2, 7, 18 and 30 after birth with a gloved hand into sterile cups which were stored at −20° C. and later at −80° C. The general quantity of *E. coli*, coliform micro-organisms and enterobacteria in the samples was determined according to ISO standards.

TABLE 11

The health indicators of test and control group calves after birth

| | Test group (n = 16) | Control group (n = 18) | p-value |
|---|---|---|---|
| Time of birth | 4.03. - Nov. 5, 2015 | 6.03. - Oct. 5, 2015 | — |
| Birth weight, kg | 42.9 ± 3.37 | 42.6 ± 3.54 | 0.843 |
| Ig level, g/L | 34.8 ± 5.47 | 35.4 ± 10.2 | 0.838 |

Results: Between the days 15-65 of their lives, only one test group calf out of 16 had diarrhoea (6.3%) as opposed to seven control group calves out of 16 (43.8%). Moreover, two control group calves died. Administering *Pediococcus acidilactici* TAK 589 Coccobest decreased the quantity of *E. coli* in the stool samples of the test group by one logarithm by day 30. The quantity of coliform bacteria and enterobacteria reduced in the stool samples of the test group by 1.1 and 1.3 logarithms respectively by day 30. At the same time, the quantity of *E. coli* in the stool samples of the control group increased by 0.5 logarithms by day 30. The quantity of coliform bacteria and enterobacteria in the stool samples of the control group increased by 0.4 logarithms by day 30.

Example 4. Fermentation of Vegetables with the
TAK 589 Coccobest Strain (Experiment 1)

Objective: Testing the suitability of *Pediococcus acidilactici* TAK 589 Coccobest for the fermentation of vegetables, e.g., white cabbage, or *Brassica oleracea* var. *capitata* f. *alba*.

Method: Cabbage was grated with a food processor into thin strips, table salt (1.7%) was added to it and mixed in carefully. Afterwards, *Pediococcus acidilactici* TAK 589 Coccobest, cultivated for 24 hours and having the final strain density of $10^7$ CFU/g, was mixed with the cabbage. Cabbages were fermented for 9 days at 18° C. Spontaneously fermented cabbage was used as a control. The pH level of the cabbage juice was measured on days 2, 5, and 9.

Results: Adding *Pediococcus acidilactici* TAK 589 Coccobest helped accelerate the fermentation of cabbage. The base pH level of the grated cabbage was 5.60. Compared to spontaneous fermentation, the pH level of the grated cabbage decreased faster (Table 12). The fast decrease in the pH level helped suppress the undesirable microflora of the cabbage, incl. lactic bacteria that create slime (e. g. *Leuconostoc mesenteroides*).

TABLE 12

The pH decrease of grated cabbage during the fermentation period

| Grated cabbage | pH on testing day | | | |
|---|---|---|---|---|
| | 1. | 2. | 5. | 9. |
| Control | 5.60 | 5.15 | 3.82 | 3.80 |
| TAK 589 | 5.60 | 4.65 | 3.67 | 3.71 |

During both tests, the fermented cabbage had no defects, tasted sour, and had a crunchy texture. *Pediococcus acidilactici* TAK 589 Coccobest is suitable for use in fermentation as a technological starter culture in order to direct the fermentation of cabbage.

Example 5. Fermentation of Vegetables with the
TAK 589 Coccobest Strain (Experiment 2)

Objective: Testing the suitability of *Pediococcus acidilactici* TAK 589 Coccobest for the fermentation of vegetables, e. g. cucumbers, or *Cucumis sativus* L, grown outdoors.

Method: A solution consisting of 1 tablespoon of table salt and 1 tablespoon of sugar per 1 liter of water was prepared for the fermentation of Estonian cucumbers grown outdoors. A culture of *Pediococcus acidilactici* TAK 589 Coccobest, cultivated for 24 hours, was added to the solution with the final density of $10^7$ CFU/g. Cucumbers (4-5 cucumbers, 400 mL liquid) were fermented at 30° C. for 24 hours. At the end of fermentation, the pH level was measured and the cucumbers cooled down to 4° C.

Results: At the end of the fermentation, the pH level of spontaneously fermented cucumbers was 4.34. The pH level of cucumbers fermented with *Pediococcus acidilactici* TAK 589 Coccobest was 3.85. Both the control cucumbers and the cucumbers fermented with *Pediococcus acidilactici* TAK 589 Coccobest had no defects. They tasted sour. Cucumbers fermented with *Pediococcus acidilactici* TAK 589 Coccobest did not have the bitter aftertaste of the spontaneously fermented cucumbers. Therefore, *Pediococcus acidilactici* TAK 589 Coccobest is suitable for use as a technological starter culture to direct the fermentation when fermenting cucumbers.

The invention claimed is:

1. A composition comprising lyophilized *Pediococcus acidilactici* TAK 589 Coccobest DSM 32372.

2. The composition of claim 1, wherein the composition is a probiotic food and beverage additive.

3. The composition of claim 1, wherein the composition is a zootechnical feed additive for preventing bacterial infections of the gastrointestinal tract and preventing and/or reducing diarrhea in farm animals and pets.

4. The composition of claim 1, wherein the compositions is a component of functional food or beverage additive to prevent bacterial infections of the gastrointestinal tract and prevent and/or reduce oxidative stress in humans.

5. The composition of claim 1, wherein the composition is a technological starter culture for fermentation of vegetables.

6. The composition of claim 1, wherein the composition is an aqueous solution.

7. The composition of claim 1, wherein the composition comprises at least one of milk replacer, milk, starter culture, or concentrated feed.

8. A method to prevent bacterial infections of the gastrointestinal tract and to prevent and/or reduce diarrhea in an animal, said method comprising administering the composition of claim 1 to the animal.

9. A method to prevent bacterial infections of the gastrointestinal tract and prevent and/or reduce oxidative stress in a human, the method comprising administering the composition of claim 1 to the human.

10. The method of claim 8, wherein the bacterial infection is caused by *Listeria monocytogenes, Escherichia coli, Salmonella enteritidis, Salmonella enterica* serovar *Typhimurium, Shigella sonnei, Staphylococcus aureus, Enterococcus faecalis* and *Cronobacter sakazakii*.

11. The method of claim 9, wherein the bacterial infection is caused by *Listeria monocytogenes, Escherichia coli, Salmonella enteritidis, Salmonella enterica* serovar *Typhimurium, Shigella sonnei, Staphylococcus aureus, Enterococcus faecalis* and *Cronobacter sakazakii*.

12. A method to inhibit a enteropathogens without suppression of lactobacilli, said method comprising administering the composition according to claim 1.

* * * * *